United States Patent [19]
Uchisawa et al.

[11] Patent Number: 5,524,865
[45] Date of Patent: Jun. 11, 1996

[54] DIAPHRAGM VALVE STRUCTURE

[75] Inventors: Osamu Uchisawa; Jun Yamashima; Shigekazu Yamazaki, all of Miyagi-ken, Japan

[73] Assignee: Kabushiki-Kaisha Motoyama Seisakusho, Miyagi-ken, Japan

[21] Appl. No.: 338,390

[22] Filed: Nov. 10, 1994

[30] Foreign Application Priority Data

Nov. 15, 1993 [JP] Japan ................................. 5-284940

[51] Int. Cl.⁶ ........................................................ F16K 7/17
[52] U.S. Cl. ............................................. 251/331; 251/359
[58] Field of Search .................................. 251/331, 61.1, 251/61.2, 335.2, 359, 361, 362, 363, 357, 365, 364, 63.5, 368, 62

[56] References Cited

U.S. PATENT DOCUMENTS

| | | | |
|---|---|---|---|
| 4,304,260 | 12/1981 | Turner et al. | 251/61.1 X |
| 4,828,219 | 5/1989 | Ohmi et al. | 251/331 X |
| 5,253,671 | 10/1993 | Kolenc | 251/331 X |

*Primary Examiner*—Kevin Lee
*Attorney, Agent, or Firm*—Baker & Daniels

[57] ABSTRACT

A diaphragm valve structure which is durable and has high reliability is obtained.

In the diaphragm valve structure, a body 11, a valve seat 12, a seat holder 13, and a diaphragm 14, are provided; an inflow passage and an outflow passage for fluids and openings thereof are formed in body 11, valve seat 12 is disposed around the periphery of the opening of the inflow passage, the valve seat is pressed downward into body 11 by seat holder 13, diaphragm 14 comes into contact with valve seat 12 and places the opening in an airtight state, and thereby, movement of fluid between the inflow passage and the outflow passage is halted. At least two projecting parts are formed between the inflow passage and the outflow passage of this diaphragm valve structure; one of these two projecting parts is formed on valve seat 12, and the other projecting part is formed either on valve seat 12 or on seat holder 13. By means of this structure, it is possible to maintain contact between diaphragm 14 and at least one projecting part, and it is possible to increase the reliability of the airtight state.

20 Claims, 3 Drawing Sheets

DIAPHRAGM VALVE STRUCTURE

TECHNICAL FIELD

The present invention relates to a diaphragm valve structure, and in particular relates to a direct-seal-type diaphragm valve structure which is employed in ultra-pure fluid lines such as semiconductor or liquid crystal production lines.

BACKGROUND OF THE INVENTION

An example of a diaphragm valve structure which was commonly conventionally employed is shown in FIG. 5. The diaphragm valve structure in FIG. 5 regulates the flow of a fluid between flow passages 21 and 22. This regulation is conducted by means of a valve seat 53, which is provided around the circumference of the opening of flow passage 21, and a diaphragm 52, which conducts the opening and the closing of this opening by means of valve seat 53. External operation is conducted by means of rotating a handle 54.

The details of the portions surrounding the diaphragm of this conventional example are shown in FIG. 6. In FIG. 6, valve seat 53 has a caulked seat structure, and the base portion of the valve seat is embedded in a body 57 at the circumference of the opening of flow passage 21 so as to be circular and concentric with this opening, and the valve seat is thus supported.

The open and closed states of the opening of flow passage 21 are formed by means of the positional relationship between diaphragm 52 and valve seat 53, which is disposed around the circumference of the opening of flow passage 21 so as to have a cross-sectionally convex shape. In the state which the diaphragm 52 is not pressed downward by means of holder 56, the diaphragm 52 is not in contact with valve seat 53, and an open state is formed in which space is present at the opening of the flow passage 21. Furthermore, when the handle 54 is rotated and holder 56 descends along body 57, diaphragm 52 is pressed downwards and comes into immediate contact with valve seat 53, thus forming a closed state.

FIG. 7 shows another conventional structural example. In this example, seat holder 61 presses against valve seat 63 from above, and valve seat 63 is thus affixed to body 67. The basic structure of flow passages 21 and 22, diaphragm 52, body 67, and the like are identical to those in the conventional example described above. Commonly, valve seat 63 is formed from resin, while seat holder 61 is formed from metal.

However, PCTFE (Poly Chloro Tri Fluoro Ethylene) is employed as the material of valve seats 53 and 63 in order to increase the air tightness as described above; however, creep occurs with repeated operation. This phenomenon occurs more noticeably when heat is applied to the resin, or when the resin is exposed to a halogen-type gas, and thus the occurrence of the phenomenon of the decrease in the strength of the valve seat is promoted.

That is to say, in the case of the conventional example first described above, the valve seat 53 is unable to withstand the force of the drive unit, is deformed, and thus creep is generated, the amount of valve lift increases, and the phenomenon proceeds to the rupture of diaphragm 52. There are valve structures in which, as a countermeasure to this problem, a lift stopper is provided at diaphragm 52; this lift stopper restricts the range of movement so that valve lift above a fixed amount does not occur. However, when the lift stopper described above operates in the state in which valve seat 53 has no reaction force, the occurrence of valve seat leakage is unavoidable. Furthermore, in the diametrical direction of diaphragm 52, this lift stopper is provided at a position separated from valve seat 53. For this reason, there is a large variation in the point at which the lift stopper 54 operates. Furthermore, in the case of the second conventional example described above, since the valve seat 63 has a structure which is sufficiently capable of withstanding the force of the drive unit, the amount of creep which occurs is limited; however, on the other hand, this involves a greater disadvantage in that the resinous valve seat 63, which is a source of gas contamination, is large.

When such conventional examples are employed in lines requiring high precision, such as semiconductor production lines or the like, the various defects described above become unavoidable problems.

The present invention has as an object thereof to provide a diaphragm valve structure possessing high durability and reliability.

DISCLOSURE OF THE INVENTION

In order to attain this object, the diaphragm valve structure of the invention in accordance with one embodiment thereof is provided with: a body, in which an inflow passage and outflow passage of the fluid, and openings thereof, are formed; a valve seat, which is disposed around the circumference of the opening of the inflow passage; a seat holder, which presses down against the valve seat; and a diaphragm, which conducts the opening and closing of the space between the inflow passage and the outflow passage; the diaphragm valve structure is characterized in that at least two projecting parts or projections are formed between the inflow passage and the outflow passage.

In the diaphragm valve structure of the invention in accordance with another embodiment thereof, a projecting part is formed on the upper surface of the valve seat, and a projecting part may also be formed on the seat holder.

In the diaphragm valve structure of the invention in accordance with yet another embodiment thereof at least two projecting parts are formed on the upper surface of the valve seat.

In the diaphragm valve structure of the invention in accordance with still another embodiment thereof, the diaphragm and at least two projecting parts into contact, forming a multiple seal.

In the diaphragm valve structure of the invention in accordance with another embodiment thereof, the height of the at least two projecting parts varies.

In the diaphragm valve structure of the invention in accordance with yet another embodiment thereof the valve seat is formed from resin, and the seat holder is formed from metal.

In the diaphragm valve structure of the invention in accordance with still another embodiment thereof, an airtight ring comprising fire-resistant material is provided at the outer circumference of the valve seat.

The diaphragm valve structure of the invention in accordance with another embodiment thereof, is characterized in that:

a body, in which the inflow passage and outflow passage of the fluid and the openings thereof are formed;

a valve seat, which is positioned around the circumference of the opening of the inflow passage and is formed unitarily with the body; and a diaphragm, which conducts the opening and the closing of the space between the inflow passage and the outflow passage;

are provided, and at least two projecting parts are formed between the inflow passage and the outflow passage.

In accordance with the diaphragm valve structure of one embodiment of the invention, at least two projecting parts are formed between the inflow passage and the outflow passage, and the diaphragm comes into contact with at least one of these projecting parts, so that the seal is more reliably formed.

In accordance with the diaphragm valve structure of another embodiment of the invention projecting parts are formed on both the valve seat and the seat holder so that the diaphragm comes into contact with at least one of these projections, and thus the structure of the seal is made more reliable.

In accordance with the diaphragm valve structure of another embodiment of the invention at least two projecting parts are formed on the upper surface of the valve seat so that the diaphragm comes into contact with at least one projecting part, and the structure of the seal is made more reliable.

In accordance with the diaphragm valve structure of another embodiment of the invention, the diaphragm and at least two projecting parts come into contact, and a multiple seal is formed, so that it is possible to reduce fluid leakage.

In accordance with the diaphragm valve structure of another embodiment of the invention, the height of the at least two projecting parts so that in the case in which creep occurs in one projecting part, the other projecting part and the diaphragm come into contact, so that the seal is more reliably formed.

In accordance with the diaphragm valve structure of another embodiment of the invention, the valve seat is formed from resin, and the seat holder is formed from metal, so that a seal is formed by a valve seat which is made of resin, and the excess compressive force of the diaphragm can be borne by the metal seat holder.

In accordance with the diaphragm valve structure of another embodiment of the invention, an airtight ring comprising a fire-resistant material is provided at the outer circumference of the valve seat so that even in the case in which the valve seat is burned or the like, a seal is formed by the seat holder, the airtight ring, and the diaphragm.

In accordance with the diaphragm valve of another embodiment structure of the invention, the inflow passage, the outflow passage, the openings thereof, and the valve seat are formed unitarily with the body, and at least two projecting parts are formed between the inflow passage and the outflow passage, so that a multiple seal is formed, and it is possible to guarantee greater airtightness.

BEST MODE FOR CARRYING OUT THE INVENTION

Figure 1:
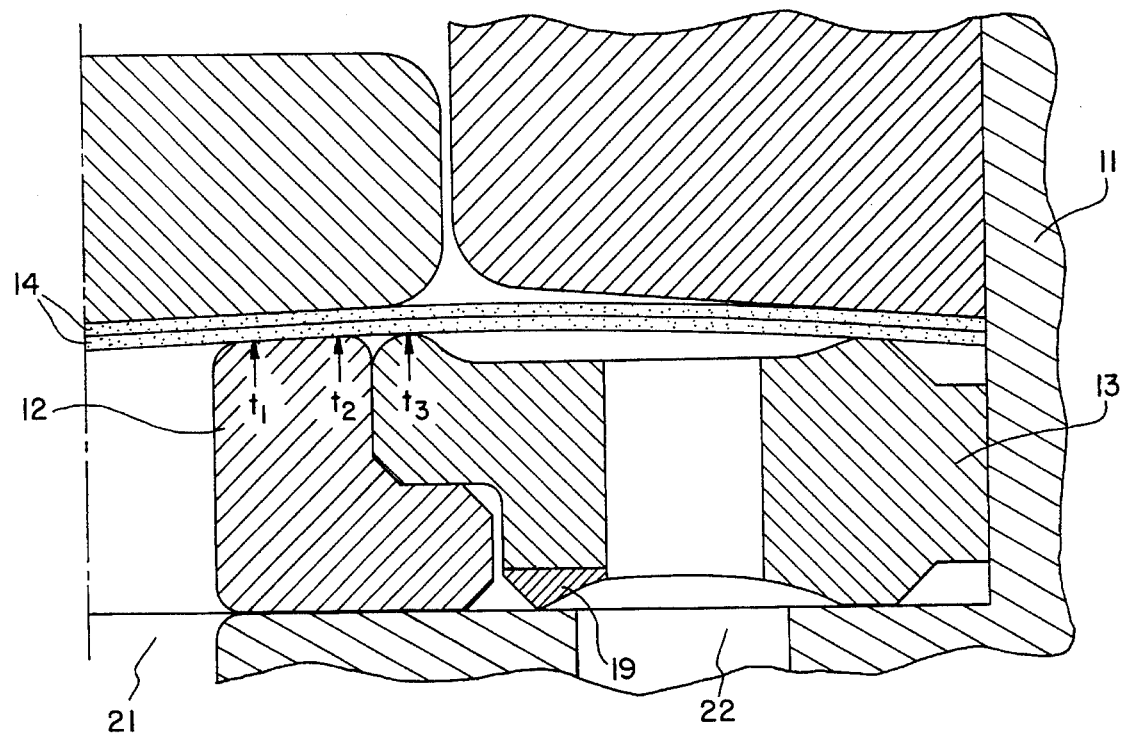
FIG. 1 is an enlarged view of the diaphragm peripheral portions A of the diaphragm valve structure of the present invention shown in FIG. 2.
Figure 2:
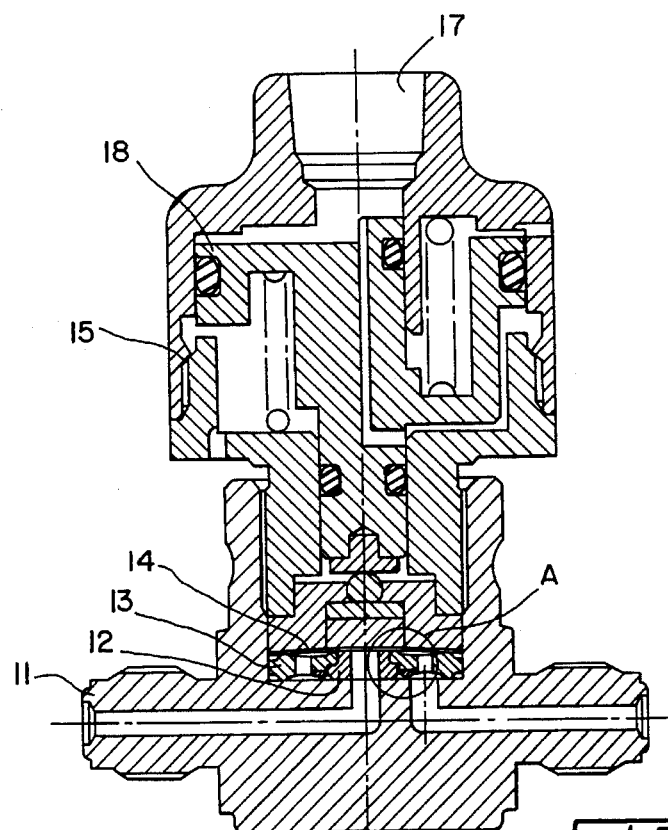
FIG. 2 is a vertical cross sectional view showing a complete structural example of an embodiment of the diaphragm valve structure of the present invention.

Next, an embodiment of a diaphragm valve structure in accordance with the present invention will be explained in detail with reference to the attached Figures. Referring to FIGS. 1 and 2, an example of the diaphragm valve structure of the present invention is shown. Hereinbelow, the structure of the present invention will be explained in detail based on the embodiments shown in the Figures.

The present invention relates to the valve structure of a diaphragm valve. FIG. 2 shows a vertical cross section of a complete structural example of a direct-seal-type diaphragm valve structure to which the present invention is applied, while FIG. 1 shows, in an enlarged form, the peripheral portions A of a valve seat 12 and a diaphragm 14 constituting the main portions of the present invention.

The diaphragm valve structure of the present embodiment is provided with a body 11, a valve seat 12, a seat holder 13, a diaphragm 14, an actuator cover 15, an air supply hole 17, a drive unit 18, and an airtight ring 19.

In body 11, a flow passage for fluids is formed, comprising inflow passage 21 and outflow passage 22, the mutual coupling of which is to be opened and closed, and furthermore, body 11 is a box-shaped part comprising a mechanism for controlling flow through valve seat 12, seat holder 13, diaphragm 14, and the like. In the present embodiment, this body 11 is formed from stainless steel (SUS).

Valve seat 12 is structured so as to be circular and concentric with the opening of the inflow passage 21 which forms the supply passage for the fluid, and comprises a seal material forming the valve seat of diaphragm 14. A planar surface is formed at the upper surface of valve seat 12, and a region of contact with diaphragm 14 is formed within the range from points $t_1$ to $t_2$. This valve seat 12 employs Pilychlorotrifluoroethylene resin (PCTFE), forming a so-called "soft valve seat".

Seat holder 13 functions both for the affixing of valve seat 12 and as a stopper for diaphragm 14. Seat holder 13 presses the valve seat 12, which encircles inflow passage 21 and is disposed around outflow passage 22, downward into body 11, and also is affixed around outflow passage 22. The portions of valve seat 12 and seat holder 13 which are in contact are formed so as to possess airtightness. Accordingly, in the case in which the openings of valve seat 12 or seat holder 13 are placed in an airtight state, the link between inflow passage 21 and outflow passage 22 is severed. Furthermore, the upper side of seat holder 13 is formed in a projecting manner, and when diaphragm 14 is pressed downward with a force greater than a predetermined force, diaphragm 14 makes contact with the projecting part of seat holder 13 at point $t_3$. Seat holder 13 is formed from the same stainless steel as body 11. Valve seat 12 is made from resin and possesses flexibility, and is compressed as a result of the compressive force of diaphragm 14; however, seat holder 13 is formed from metal and is rigid.

Diaphragm 14 is a valve which regulates the flow rate of the fluid. In the free state thereof, diaphragm 14 is positioned above the openings of the flow passages, thus freeing the openings of inflow passage 21 and outflow passage 22 and causing them to be connected. Diaphragm 14 is pressed downwards, the area of the opening formed between diaphragm 14 and valve seat 12 is gradually replaced, and diaphragm 14 then comes into contact with valve seat 12, closes the opening of inflow passage 21, and thus severs the connection between inflow passage 21 and outflow passage 22. A nickel alloy is used as the material therefor, and a flexible structure, a so-called "diaphragm", is formed.

Actuator cover 15 is the cover for the drive mechanism controlling the operation of diaphragm 14. The diaphragm valve structure of the present embodiment is pneumatically driven, so that compressed air is supplied from air supply hole 17, drive unit 18 presses downwards, and diaphragm 14 is pressed into contact with valve seat 12. Actuator cover 15 is a cover which supports the drive unit 18 in airtight state.

The airtight ring 19 shown in FIG. 1 is a ring which has a triangular cross sectional shape, and is disposed in the space between seat holder 13 and body 11 so as to be circular and concentric with the opening of the flow passage. This airtight ring 19 is formed from stainless steel. The purpose of providing an airtight ring 19 in this manner is so that even in the case in which the heat resistance of the resin forming the valve seat 12 is low, and as a result of the heat resulting from an unforeseen accident such as the combustion of the gas in the flow passages or the like, the problem of a decline in the airtightness of the valve seat 12 occurs, even if the airtight state between valve seat 12 and the seat holder 13 breaks down, the airtightness between inflow passage 21 and outflow passage 22 can be maintained.

The diaphragm valve comprising the various parts described above conducts the opening and closing operations by means of the following procedures. In the normal state, the drive unit 18 is positioned at a high position, and space is present between diaphragm 14 and the valve seat 12 and the opening of seat holder 13, so that the space between inflow passage 21 and outflow passage 22 is freed. When compressed air is supplied to air supply hole 17 and drive unit 18 presses downward, compressive force acts on diaphragm 14 and it is pressed downward. The space between the diaphragm 14 which is pressed downward and the valve seat 12 and the opening of the seat holder 13 is reduced, and diaphragm 14 first comes into contact with the upper portion of valve seat 12 at a position between points $t_1$ and $t_2$, and the opening is sealed.

In the case in which further compressive force is placed on diaphragm 14, the projecting part of valve seat 12 is compressed. The diaphragm 14 which is pressed downward comes into contact with the projecting part of seat holder 13 as well at point $t_3$. When diaphragm 14 has come into contact with seat holder 13, it does not descend further.

The diaphragm 14, which comes into contact with the valve seat 12 and the projecting part of seat holder 13, places the inflow passage 21 in an airtight state at valve seat 12 and seat holder 13. A double seal is formed, at the area of contact with valve seat 12 between contact points $t_1$ and $t_2$ and at the contact point $t_3$ with the seat holder.

The diaphragm valve structure described above produces the following effects.

(1) The sealing effect is increased as a result of the structure of the multiple seal. The plurality of valve seats formed in an annular shape reduces the air pressure difference corresponding to each valve seat, and increases the precision of the airtightness.

(2) By dispersing the pressure load placed on the diaphragm with a metal seat holder, the application of an excessive load to the valve seat is prevented, and it is possible to make the valve seat more reliable and more compact.

(3) The force of contact with the diaphragm is stabilized and made uniform, the occurrence of abrasion, wear and tear, fatigue, leakage, and the like of the projecting parts of the valve seat are reduced, and the lift amount of the diaphragm is stabilized, so that the reliability of the valve structure is improved.

(4) The airtight structure employing multiple rings increases protective activity with respect to leakage resulting from the entry of foreign material, so that the reliability is improved.

(5) By means of disposing an airtight ring between the seat holder and the body, even in the case in which, during the occurrence of an unforeseen accident during the inflow of an active gas, the permitted temperature range of the valve seat is exceeded, and the airtightness between the valve seat and the seat holder fails, airtightness can be maintained by means of the seat holder.

(6) As a result of constructing the valve seat with a spring structure, the contact pressure between the valve seat and the diaphragm always remains within a pre-specified range, and it is possible to maintain an airtight state for a long period of time.

Figure 3:
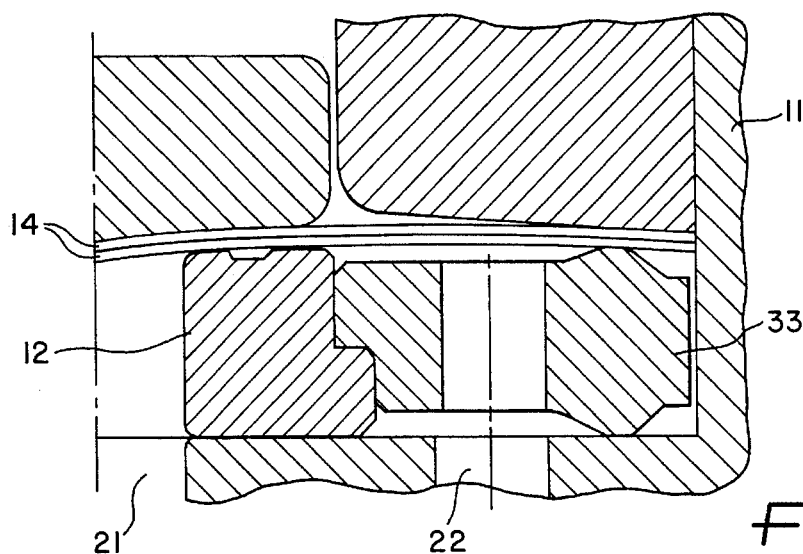
FIG. 3 is an enlarged view of the diaphragm peripheral portions showing a second embodiment of the present invention.

In alternative embodiment 1 shown in FIG. 3, a resin is used for the material of seat holder 33, in contrast to the stainless steel which was employed in the first embodiment described above. Two or more projecting parts are provided on the valve seat 12. These projecting parts are formed in the shape of a so-called "protrusion" or that of a gentle wave. The relative heights of the plurality of protruding parts are such that these heights are equal or are provided with a difference in height. In the case in which the heights thereof are equal, a multiple seal with the diaphragm is created. In the case in which a difference in height is provided, the contact state changes depending on the conditions, so that in the case in which diaphragm 14 is subjected to a compressive force in excess of a predetermined amount, or in the case in which a leak occurs at the higher projecting part, the lower projecting part also comes into contact. Furthermore, the outer projecting parts are formed so as to have a width greater than that of the inner projecting parts.

Since the outer projecting parts are wider than the inner projecting parts, the durability thereof is high with respect to the downward force of diaphragm 14, and these projecting parts are unlikely to suffer compressive deformation. For this reason, it is possible to repeatedly place a downward load of diaphragm 14 above a pre-specified amount on these projecting parts.

The other parts, body 11, valve seat 12, diaphragm 14, and actuator cover 15 are identical to those described in the example above. However, an airtight ring 19 is not provided. This modified example is designed to, in particular, maintain airtightness over a long period of time and to reduce costs.

Figure 4:
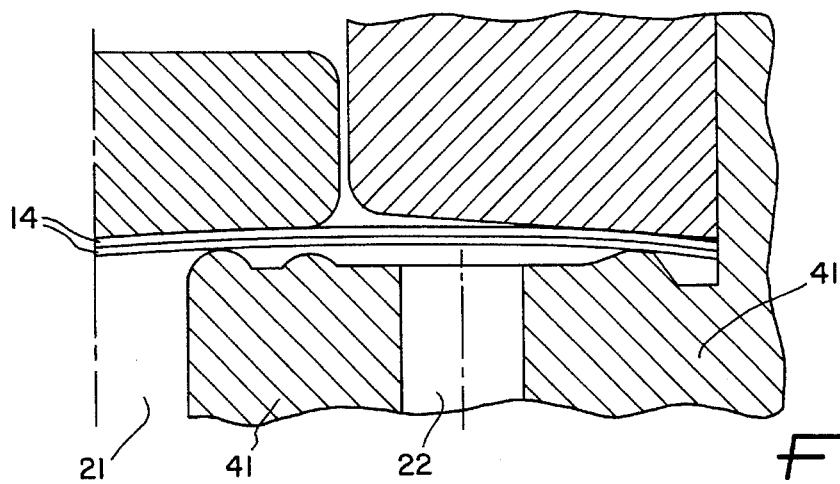
FIG. 4 is an enlarged view of the diaphragm peripheral portions showing a modified third embodiment of the present invention.
Figure 7:
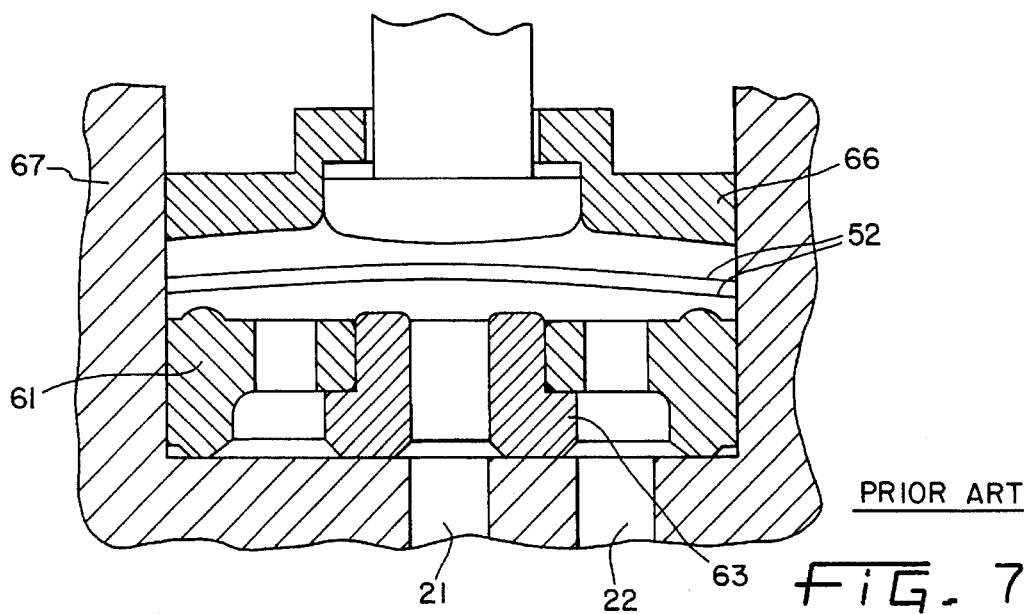
FIG. 7 is a cross sectional view showing the structure of the diaphragm peripheral portions of another conventional diaphragm valve structure.
Figure 5:
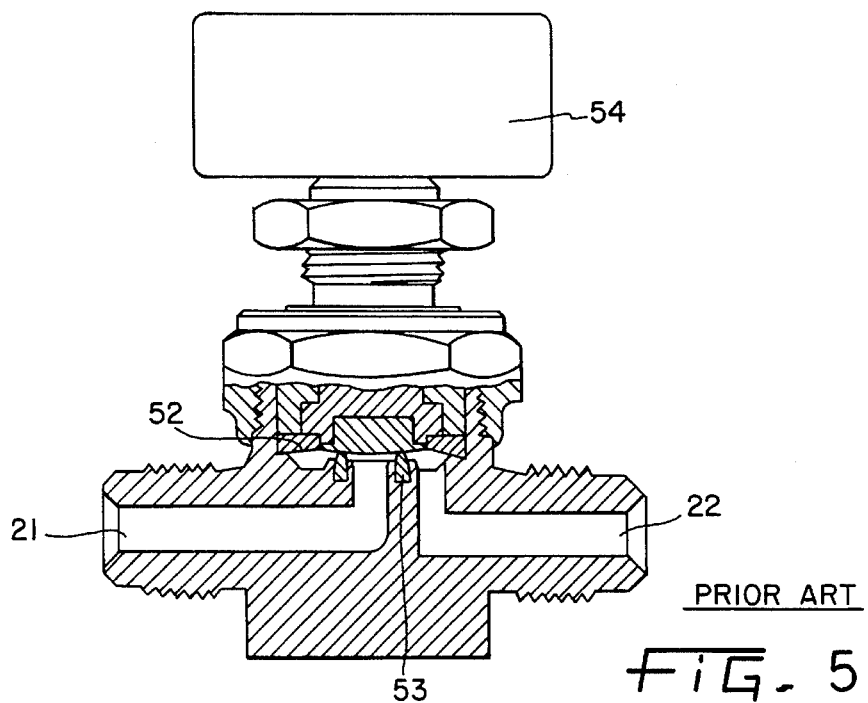
FIG. 5 is a partial cross sectional view showing the structure of the diaphragm peripheral portions and a complete structural example of a conventional diaphragm valve structure.
Figure 6:
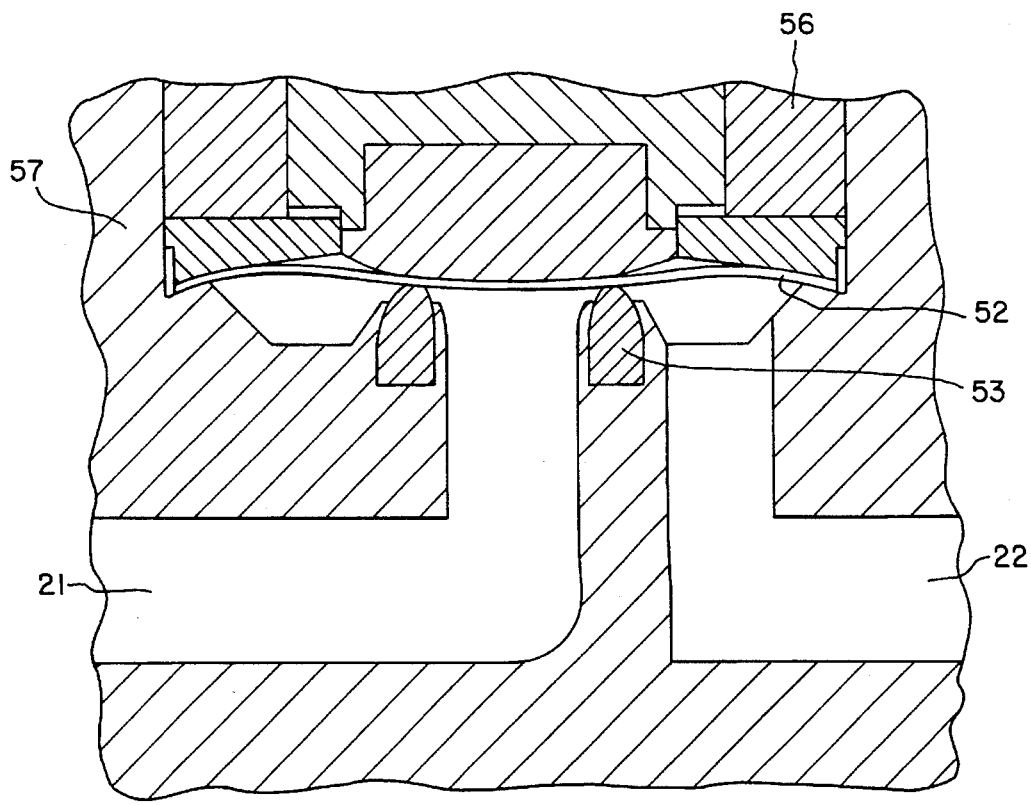
FIG. 6 is a cross sectional view showing the structure of the diaphragm peripheral portions of a conventional diaphragm valve structure.

In the embodiment shown in FIG. 4, the valve seat and the seat holder are formed unitarily with the body 41. Two or more projecting parts are formed in the valve seat part which is formed unitarily with the body, and when diaphragm 14 is pressed downward, diaphragm 14 and these two or more projecting parts come into contact and form a multiple seal.

This particular embodiment prevents a reduction in the purity of the inner fluid as a result of the characteristics of the material such as resin or the like, and is particularly applicable to diaphragm valve structures for use under high temperatures. It is known that if the surface area of a resin surface is large, a reduction of the purity of the fluid resulting from the exuding of impurities, in particular, moisture and the like, is likely to occur. The present embodiment makes up for the defect that a seal between metallic parts is less airtight than a seal between metal and a resin, by means of a multiple seal structure, and furthermore, maintains high purity.

The example described above is an example of a preferable embodiment of the present invention; however, the present invention is not limited to this embodiment, and a number of modified examples are possible insofar as these do not deviate from the essence of the present invention. For example, the restrictions with respect to the materials in the example are only one example, and other materials may be employed.

In the diaphragm valve structure in accordance with one embodiment of the invention, the diaphragm comes into contact with at least one of the two or more projecting parts, so that the seal is more reliably formed, and it is possible to increase the reliability of the diaphragm valve.

In the diaphragm valve structure in accordance with another embodiment of the invention, projecting parts are formed on the valve seat and the seat holder and the diaphragm comes into contact with at least one of the projecting parts, so that the structure of the seal is more reliable, and it is possible to increase the reliability of the diaphragm valve.

In the diaphragm valve structure in accordance with another embodiment of the invention, at least two projecting parts are formed in the upper surface of the valve seat and at least one projecting part comes into contact with the diaphragm, so that the structure of the seal is more reliable, and the reliability of the diaphragm valve can be increased.

In the diaphragm valve structure in accordance with another embodiment of the invention, a multiple seal is formed by means of two or more projecting parts, and the seal effect is made more reliable, so that it is possible to reduce fluid leakage.

In the diaphragm valve structure in accordance with another embodiment of the invention, the heights of the two or more projecting parts differ, and even in the case in which creep occurs in one projecting part, the diaphragm comes into contact with the other projecting part, so that the structure of the seal is more reliable, and the reliability of the diaphragm valve can be improved.

In the diaphragm valve structure in accordance with another embodiment of the invention, the valve seat is formed from resin, and furthermore, the seat holder is formed from metal, so that a seal is formed by the valve seat which is made of resin, and the excess compressive force of the diaphragm is borne by the metal seat holder, and thereby, deformation and degradation of the valve seat is reduced, and it is possible to stably maintain the structure of the seal for a long period of time.

In the diaphragm valve structure in accordance with another embodiment of the invention, an airtight ring comprising a fire-resistant material is present around the periphery of the valve seat and even in the case in which the valve seat suffers combustion damage or the like, a seal is formed by the seat holder, the airtight ring, and the diaphragm, and it is thus possible to prevent a failure such as an opening of the valve as a result of an unforeseen accident.

In the diaphragm valve structure in accordance with another embodiment of the invention, the inflow passage, the outflow passage, the openings, the valve seat, and the like are formed unitarily with the body, and at least two projecting parts are formed between the inflow passage and the outflow passage, so that a multiple seal can be formed by means of a simple mechanical structure, and it is possible to maintain a higher degree of airtightness.

What is claimed is:

1. A diaphragm valve structure comprising:
   a body which defines an inflow passage and an outflow passage for a fluid, said inflow passage and outflow passage each having an opening;
   a valve seat, surrounding said opening of said inflow passage;
   a seat holder for pressing said valve seat against said body; and
   a diaphragm for opening and closing a connecting passage between said inflow passage and said outflow passage; and
   a plurality of projections for engaging said diaphragm, said projections disposed on one of said valve seat; said seat holder; and said valve seat and said seat holder; said projections disposed between said inflow passage and said outflow passage.

2. A diaphragm valve structure in accordance with claim 1, characterized in that at least one of said projections is formed on an upper surface of said valve seat, and at least one of said protections is formed on said seat holder.

3. A diaphragm valve structure in accordance with claim 1, characterized in that two or more of said projections are formed on an upper surface of said valve seat.

4. A diaphragm valve structure in accordance with claim 1, characterized in that two or more of said projections and said diaphragm come into contact, and a multiple seal is formed.

5. A diaphragm valve structure in accordance with claim 1, characterized in that two or more of said projections possess differing heights.

6. A diaphragm valve structure in accordance with claim 1, characterized in that said valve seat is formed from resin, and said seat holder is formed from metal.

7. A diaphragm valve structure in accordance with claim 1, characterized in that an airtight ring comprising a fire-resistant material is located between said outflow passage and said valve seat.

8. A diaphragm valve structure in accordance with claim 2, characterized in that two or more of said projections and said diaphragm come into contact, and a multiple seal is formed.

9. A diaphragm valve structure in accordance with claim 3, characterized in that said two or more projections and said diaphragm come into contact, and a multiple seal is formed.

10. A diaphragm valve structure in accordance with claim 2, characterized in that two or more of said projections possess differing heights.

11. A diaphragm valve structure in accordance with claim 3, characterized in that said two or more projections possess differing heights.

12. A diaphragm valve structure in accordance with claim 2, characterized in that said valve seat is formed from resin, and said seat holder is formed from metal.

13. A diaphragm valve structure in accordance with claim 3, characterized in that said valve seat is formed from resin, and said seat holder is formed from metal.

14. A diaphragm valve structure in accordance with claim 4, characterized in that said valve seat is formed from resin, and said seat holder is formed from metal.

15. A diaphragm valve structure in accordance with claim 5, characterized in that said valve seat is formed from resin, and said seat holder is formed from metal.

16. A diaphragm valve structure in accordance with claim 2, characterized in that an airtight ring comprising a fire-resistant material is located between said outflow passage and said valve seat.

17. A diaphragm valve structure in accordance with claim 3, characterized in that an airtight ring comprising a fire-resistant material is located between said outflow passage and said valve seat.

18. A diaphragm valve structure in accordance with claim 4, characterized in that an airtight ring comprising a fire-resistant material is located between said outflow passage and said valve seat.

19. A diaphragm valve structure in accordance with claim 5, characterized in that an airtight ring comprising a fire-resistant material is located between said outflow passage and said valve seat.

20. A diaphragm valve structure, comprising:

a body which defines an inflow passage and an outflow passage for fluids, said inflow passage and outflow passage each having an opening;

a valve seat, surrounding said opening of said inflow passage, and is formed unitarily with said body;

and a diaphragm for opening and closing a connecting passage between said flow passage and said outflow passage; and a plurality of projections located between said inflow passage and said outflow passage on said valve seat.

* * * * *